(12) United States Patent
Suzuki (10) Patent No.: US 12,407,909 B2
(45) Date of Patent: Sep. 2, 2025

(54) IMAGE PICKUP APPARATUS

(71) Applicant: CANON KABUSHIKI KAISHA, Tokyo (JP)

(72) Inventor: Yuto Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/061,558

(22) Filed: Dec. 5, 2022

(65) Prior Publication Data

US 2023/0179847 A1 Jun. 8, 2023

(30) Foreign Application Priority Data

Dec. 8, 2021 (JP) ................. 2021-199528

(51) Int. Cl.
*H04N 23/52* (2023.01)
*H04N 23/68* (2023.01)

(52) U.S. Cl.
CPC ........... *H04N 23/52* (2023.01); *H04N 23/687* (2023.01)

(58) Field of Classification Search
CPC ..... G03B 17/12; G03B 17/55; H04N 21/2187
See application file for complete search history.

(56) References Cited

U.S. PATENT DOCUMENTS

| 2017/0187906 | A1* | 6/2017 | Toichi | H04N 23/50 |
| 2019/0154949 | A1* | 5/2019 | Hosoe | G05D 23/1919 |
| 2019/0373765 | A1* | 12/2019 | Naito | G03B 21/16 |
| 2020/0120250 | A1* | 4/2020 | Colin | H05K 7/20145 |
| 2021/0141428 | A1* | 5/2021 | Lin | G05B 15/02 |
| 2021/0318594 | A1* | 10/2021 | Schmit | H04N 23/51 |
| 2022/0294957 | A1* | 9/2022 | Iwasaki | H04N 23/687 |

FOREIGN PATENT DOCUMENTS

JP 2020-057890 A 4/2020

* cited by examiner

*Primary Examiner* — Xi Wang
(74) *Attorney, Agent, or Firm* — Cowan, Liebowitz & Latman, P.C.

(57) ABSTRACT

An image pickup apparatus includes an image sensor configured to capture an object image, an electronic device configured to perform processing relating to imaging, a duct thermally connected to the electronic device, a first airflow generating unit configured to generate first airflow for cooling the electronic device in the duct, and a second airflow generating unit disposed outside the duct and configured to generate second airflow for cooling the image sensor.

8 Claims, 8 Drawing Sheets

IMAGE PICKUP APPARATUS

BACKGROUND

Technical Field

One of the aspects of the disclosure relates to an image pickup apparatus that internally generates an airflow for cooling.

Description of the Related Art

Image pickup apparatuses such as digital still cameras and video cameras include image sensors such as CMOS sensors and CCD sensors, and electronic devices such as CPUs and ICs mounted on circuit boards, and these components generate heat. In a case where the temperatures of the image sensor and electronic device excessively rise, their performance may deteriorate or malfunction may occur, resulting in poor imaging.

Japanese Patent Laid-Open No. ("JP") 2020-57890 discloses an image pickup apparatus including an image sensor, a substrate mounted with a plurality of ICs, and a plurality of cooling fans disposed in a duct thermally connected to the substrate.

However, in the image pickup apparatus disclosed in JP 2020-57890, the air generated by the plurality of cooling fans and flowing through the duct mainly cools the substrate, and may not sufficiently cool the image sensor.

SUMMARY

The disclosure provides an image pickup apparatus that can sufficiently cool not only an electronic device but also an image sensor.

An image pickup apparatus according to one aspect of the disclosure includes an image sensor configured to capture an object image, an electronic device configured to perform processing relating to imaging, a duct thermally connected to the electronic device, a first airflow generating unit configured to generate first airflow for cooling the electronic device in the duct, and a second airflow generating unit disposed outside the duct and configured to generate second airflow for cooling the image sensor.

Further features of the disclosure will become apparent from the following description of exemplary embodiments with reference to the attached drawings.

DESCRIPTION OF THE EMBODIMENTS

Referring now to the accompanying drawings, a description will be given of embodiments according to the disclosure.

First Embodiment

Figure 8:
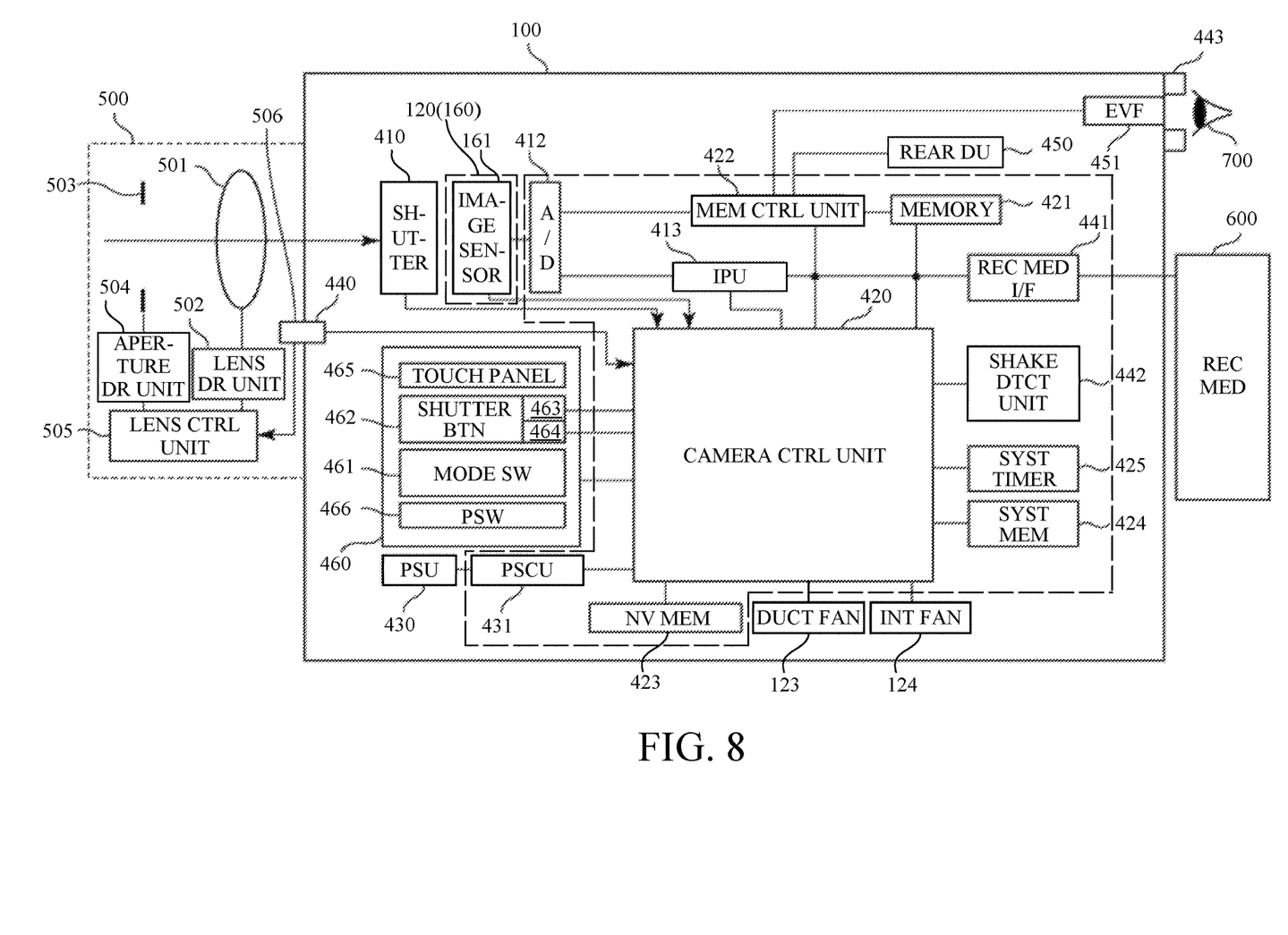
FIG. 8 is a block diagram illustrating the configuration of the digital camera according to the first embodiment.

FIG. 8 illustrates a configuration of a digital camera (simply referred to as a camera hereinafter) 100 as an image pickup apparatus according to a first embodiment of the disclosure. A lens unit 500 including a lens 501 is attachable to and detachable from (interchangeable from) the camera 100. Although only one lens 501 is illustrated in FIG. 8 for simplification, a plurality of lenses are actually provided.

In the camera 100, a shutter 410 is a focal plane shutter that controls the exposure time of an image sensor 161, which will be described below, and its operation is controlled by a camera control unit 420, which will be described below. The image sensor 161 includes a CCD sensor or a CMOS sensor, photoelectrically converts (images) an object image (optical image) formed by light passing through the lens 501, and outputs an imaging signal (analog signal). An A/D converter 412 converts an analog imaging signal output from the image sensor 161 into a digital imaging signal. The digital imaging signal is written into a memory 421 via an image processing unit 413 and a memory control unit (mem ctrl) 422, which will be described below, or only via the memory control unit 422.

The image processing unit (IPU) 413 performs image processing such as pixel interpolation processing, resizing processing, and color conversion processing for the digital imaging signal from the A/D converter 412 or the memory control unit 422, and generates image data. The image processing unit 413 also performs auto white balance (AWB) processing based on a calculation result using the image data.

The camera control unit 420 includes a computer including a processor such as a CPU and circuits, and controls the entire camera 100 and lens unit 500 by executing programs stored in a nonvolatile memory (nv mem) 423. For example, the camera control unit 420 controls the image sensor 161 and the shutter 410 according to an imaging instruction by the user, and performs autofocus (AF) control and aperture control based on the image data generated by the image processing unit 413.

The memory 421 temporarily stores the digital imaging signal output from the A/D converter 412 and the image data generated by the image processing unit 413. The memory control unit 422 controls data communications among the A/D converter 412, the image processing unit 413, and the memory 421. The nonvolatile memory 423 is an electrically erasable/recordable read-only memory, and stores constants, programs, and the like for the operations of the camera control unit 420. A system (syst) memory 424 is a readable and writable memory that stores constants and variables for operations of the camera control unit 420, programs read from the nonvolatile memory 423, and the like.

A system (syst) timer 425 measures the non-operation time until auto power-off, which puts the camera 100 into a power-saving state to prevent battery consumption in a case where the camera 100 is not operated by the user, and the exposure time of the image sensor 161 by the shutter 410.

A power supply unit (psu) 430 includes a primary battery, a secondary battery, or an AC adapter. A power supply control unit (pscu) 431 determines whether or not a battery is attached to the power supply unit 430, determines the type of the attached battery, detects the remaining battery level, and supplies the required voltage to the supply destination at the required timing.

A camera communication terminal 440 is electrically connected to a lens communication terminal 506 provided in the lens unit 500 and enables communication between the camera control unit 420 and a lens control (ctrl) unit 505 within the lens unit 500.

A recording medium interface (rec med I/F) 441 is an interface with a recording medium (rec med) 600 attachable to and detachable from the camera 100. The recording medium 600 is a memory card, FLASH memory, hard disk drive, or the like, and records image data (still image and moving image) generated by the image processing unit 413.

A shake detecting (dtct) unit 442 includes a gyro sensor or the like, and outputs a signal corresponding to the shake of the camera 100 due to manual (camera) shake or the like (referred to as camera shake hereinafter).

The A/D converter 412, the image processing unit 413, the camera control unit 420, the memory 421, the memory control unit 422, the nonvolatile memory 423, the system memory 424, the system timer 425, and the power supply control unit 431 described above include a plurality of electronic devices such as a CPU, an IC, memory chips, and are mounted on a main board (substrate) 121. The recording medium I/F 441 and the shake detecting unit 442 are also mounted on the main board 121.

The memory 421 described above also serves as a memory for image display (video memory). The digital imaging signal and image data written in the memory 421 are displayed as a live-view image and an image for a confirmation of imaging via the memory control unit 422 on a rear display unit (rear du) 450 provided on the back surface of the camera 100 and an Electric View Finder (EVF) display unit 451 disposed in a viewfinder. The rear display unit 450 and the EVF display unit 451 include display elements such as liquid crystal panels and organic EL panels.

An operation unit 460 is an input unit that accepts an operation by the user, and outputs a signal corresponding to the operation accepted here to the camera control unit 420. The operation unit 460 includes various operation members such as a mode switch (sw) 461, a first shutter switch 463, and a second shutter switch 464 interlocked with a shutter button (btn) 462, a touch panel 465, a power switch (psw) 466, and the like. The mode switch 461 is operated to switch between an imaging mode for still image capturing and moving image capturing. The shutter button 462 is operated by the user to give an imaging preparation instruction and an imaging instruction. The first shutter switch 463 is turned on by half-pressing the shutter button 462 and outputs an SW1 signal to the camera control unit 420. The second shutter switch 464 is turned on by fully pressing the shutter button 462 and outputs an SW2 signal to the camera control unit 420. The camera control unit 420 executes the imaging preparation operation (AF, auto-exposure (AE), AWB, etc.) according to the SW1 signal, and executes still image imaging processing for recording according to the SW2 signal.

The operation unit 460 also includes the touch panel 465 provided on the rear display unit 450. A power switch 466 is operated to power on and off the camera 100.

A duct fan (first airflow generating unit) 123 generates airflow in a duct, which will be described below and is thermally connected to the main board 121, and is provided to cool electronic devices that perform control and processing related to imaging, such as CPUs and ICs as heat sources among many electronic devices mounted on the main board 121. An internal fan (int fan: second airflow generating unit) 124 is provided to cool the image sensor 161 by generating airflow near the imaging unit 120 including the image sensor 161 as a heat source outside the duct. The camera control unit (control unit) 420 controls the driving (rotation, stop, and the number of rotations) of each of the duct fan 123 and the internal fan 124. The cooling effect of the duct fan 123 and internal fan 124 will be described below.

In the lens unit 500, a lens communication terminal 506 is a communication terminal for the lens unit 500 to communicate with the digital camera 100 via the camera communication terminal 440.

In the lens unit 500, the lens control unit 505, which has received a control instruction from the camera control unit 420 by communication, performs position (F-number of aperture value) control of an aperture stop (diaphragm) 503 via an aperture driving (dr) unit 504 and focus control of the lens 501 via a lens driving (dr) unit 502.

Figure 1A:
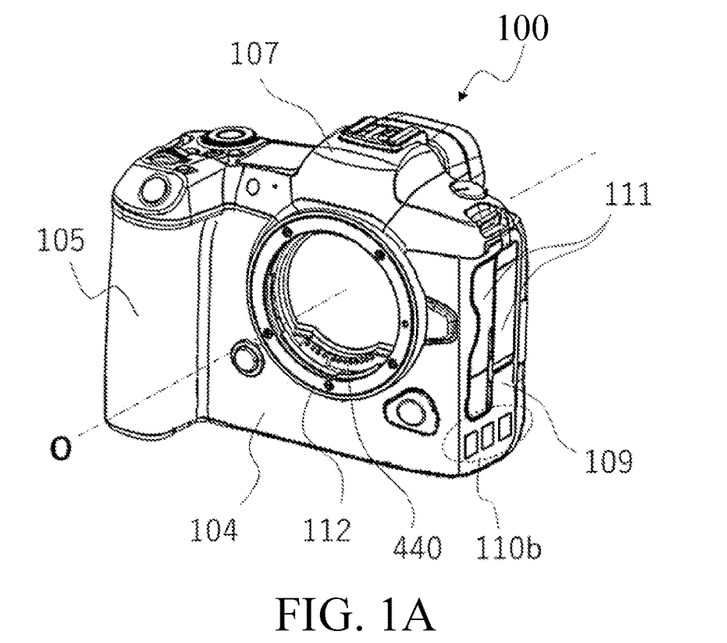
FIGS. 1A and 1B are perspective views of a digital camera according to a first embodiment.
Figure 1B:
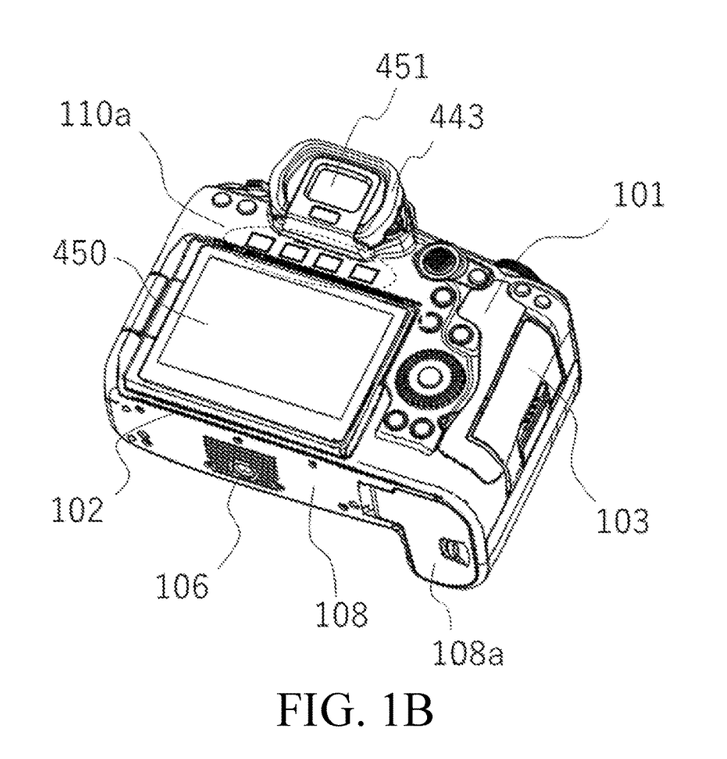

FIGS. 1A and 1B illustrate the appearance of the camera 100. In the following description, an object side of the camera 100 is also called a front side, and a back surface side is also called a rear side. FIG. 1A illustrates the appearance of the camera 100 viewed obliquely from the front side, and FIG. 1B illustrates the appearance of the camera 100 viewed obliquely from the rear side. 0 denotes an imaging optical axis from the lens unit 500 to the image sensor 161.

A plurality of operating members that can be operated by the user are attached to a rear cover 101. The viewfinder unit that includes the EVF display unit 451 and an eyepiece unit 443 to which a user observing the EVF display unit 451 brings his eye 700 closer as illustrated in FIG. 8 is attached to the rear cover 101.

A duct, which will be described below, is provided inside the camera 100 (between the main board 121 and the rear cover 101), and the rear cover 101 is formed with ventilation ports 110a that allow air to enter the duct. A display housing unit 102 is provided to house the rear display unit 450 as a variable angle monitor that is rotatable relative to the camera 100. A recording medium lid 103 is a cover that closes an opening of a slot that houses the recording medium (memory card) 600 described above.

A mount 112 to which the lens unit 500 is attached is fixed to a front base 104, and a grip unit 105 for gripping the camera 100 by the user is provided to the front base 104. A battery lid 108a is attached to a bottom cover 108 to close an opening of a battery chamber. The bottom cover 108 also has an opening for exposing a tripod seat 106 fixed to a bottom surface portion of the front base 104.

A top cover 107 is provided with a plurality of operating members (mode switch 461, shutter button 462, power switch 466, etc.) that can be operated by the user. A terminal cover 111 for protecting an external communication terminal 121c, which will be described below, is attached to a side cover 109, and ventilation ports 110b for exhausting air from the duct are formed in the side cover 109.

Figure 2:
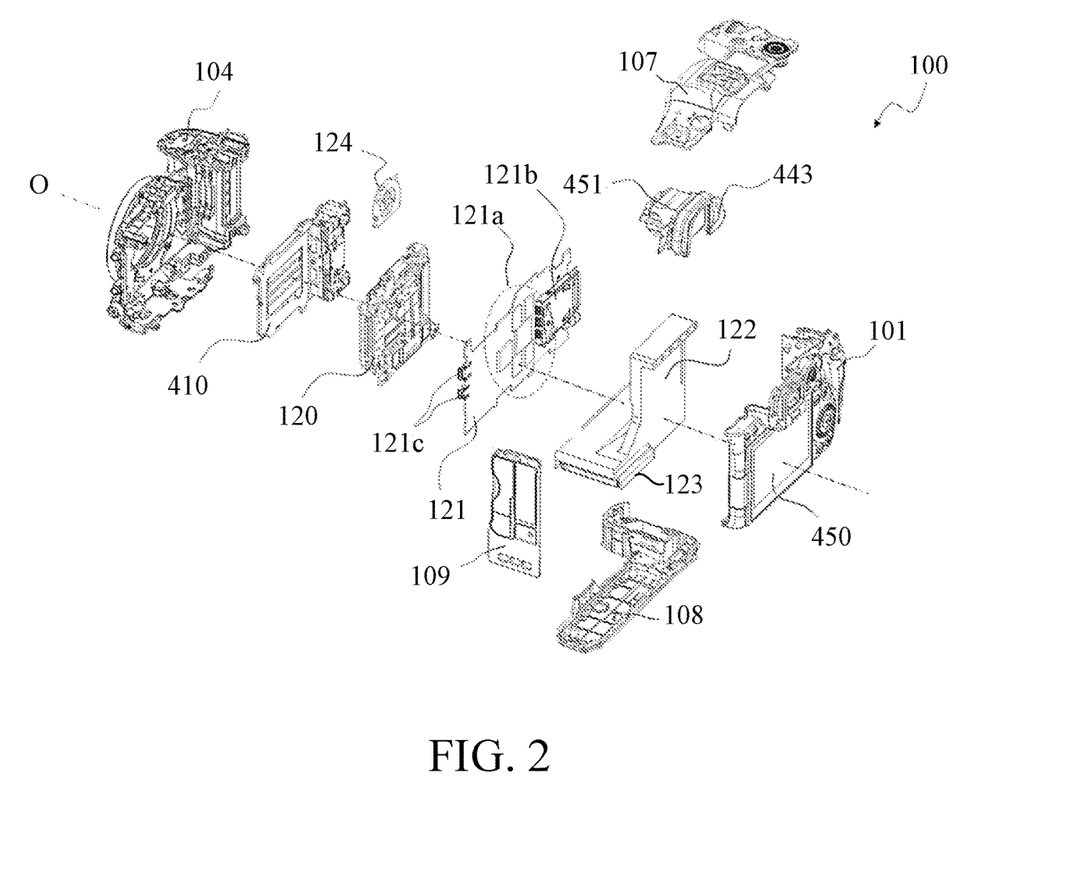
FIG. 2 is an exploded perspective view of the digital camera according to the first embodiment.

FIG. 2 is an exploded view of the camera 100 illustrated in FIGS. 1A and 1B. The rear cover 101, the front base 104, the top cover 107, the bottom cover 108, and the side cover 109 described above form the exterior of the camera 100. An imaging unit 120, the main board 121, the duct 122, the shutter 410, the EVF display unit 451, and the like are provided Inside the camera 100.

The main board 121 is mounted with a plurality of electronic devices (referred to as a heat-generating element group hereinafter) 121a that serve as heat generating sources, a recording medium I/F 121b (441 in FIG. 8), and the external communication terminal 121c to which a cable to be connected to an unillustrated external device.

The duct 122 is formed so that air from the outside of the camera 100 is drawn into an area near the heat-generating element group 121a. The duct fan 123 is disposed inside the duct 122.

Since the heat-generating element group 121a consumes a particularly large amount of power and generates a large heat value (calorific value) in the camera 100, the imageable time of the camera 100 is limited by the guaranteed operating temperature of the heat-generating element group 121a, excluding the remaining battery power. In order to maximize the imageable, it is necessary to cool the heat-generating element group 121a so that their temperature does not exceed the guaranteed operating temperature. This embodiment provides the duct 122 on the rear side of the main board 121 as illustrated in FIG. 2 to thermally connect the heat-generating element group 121a and the duct 122 to each other, to generate the airflow (first airflow) in the duct 122 by the duct fan 123, and to cool the heat-generating element group 121a.

The internal fan 124 is disposed around the imaging unit 120 disposed on the front side of the main board 121 and generates an airflow (second airflow) that flows along the back surface of the image sensor 161 opposite to the imaging plane to cool the image sensor 161. In this embodiment, the internal fan 124 is disposed so that the air discharge direction is orthogonal to the imaging optical axis O of the camera 100. However, as long as the air discharged from the internal fan 124 is applied to the image sensor 161, the discharge direction does not have to be orthogonal to the imaging optical axis O.

Disposing the outlet (discharge port) of the internal fan 124 so as to flow air between the imaging unit 120 and the main board 121 can cool both the image sensor 161 and the heat-generating element group 121a. Since the imaging unit 120 in this embodiment has a movable portion 160, which will be described below, and a heat radiation path is narrow, disposing the outlet of the internal fan 124 at a position closer to the imaging unit 120 than the main board 121 can more effectively cool the image sensor 161.

This embodiment uses a centrifugal fan for the duct fan 123 and the internal fan 124 as the airflow generating units. However, other fans such as an axial (flow) fan may be used. A blower or the like may be used as an airflow generating unit other than a fan.

Figure 3A:
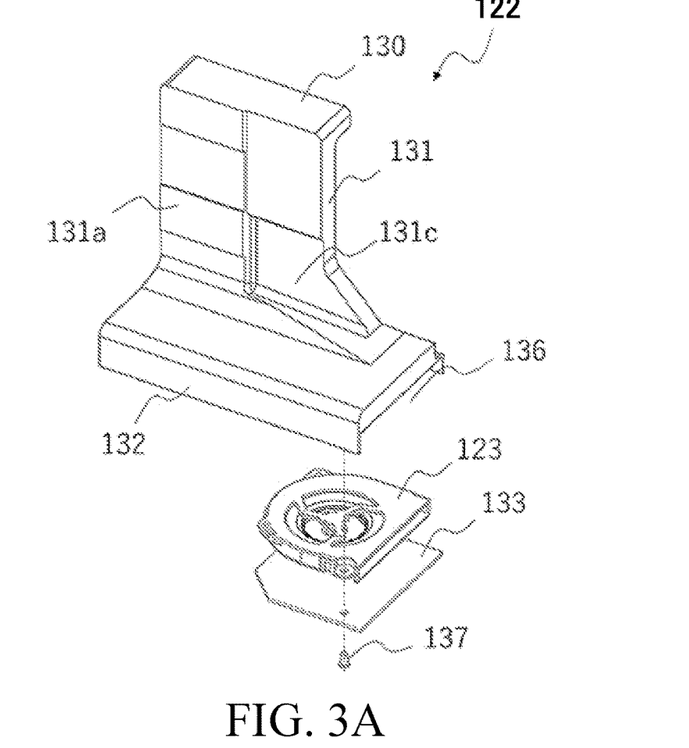
FIGS. 3A and 3B are perspective views of a duct in the digital camera according to the first embodiment.
Figure 3B:
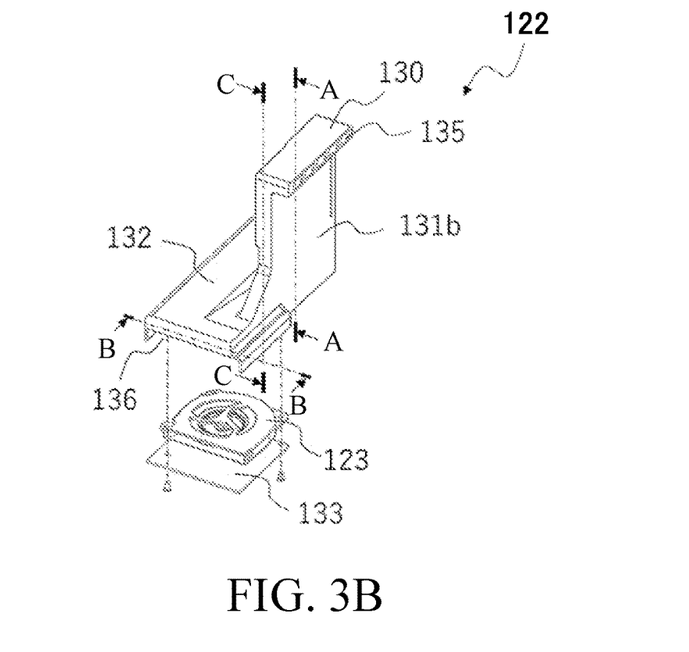
Figure 4:
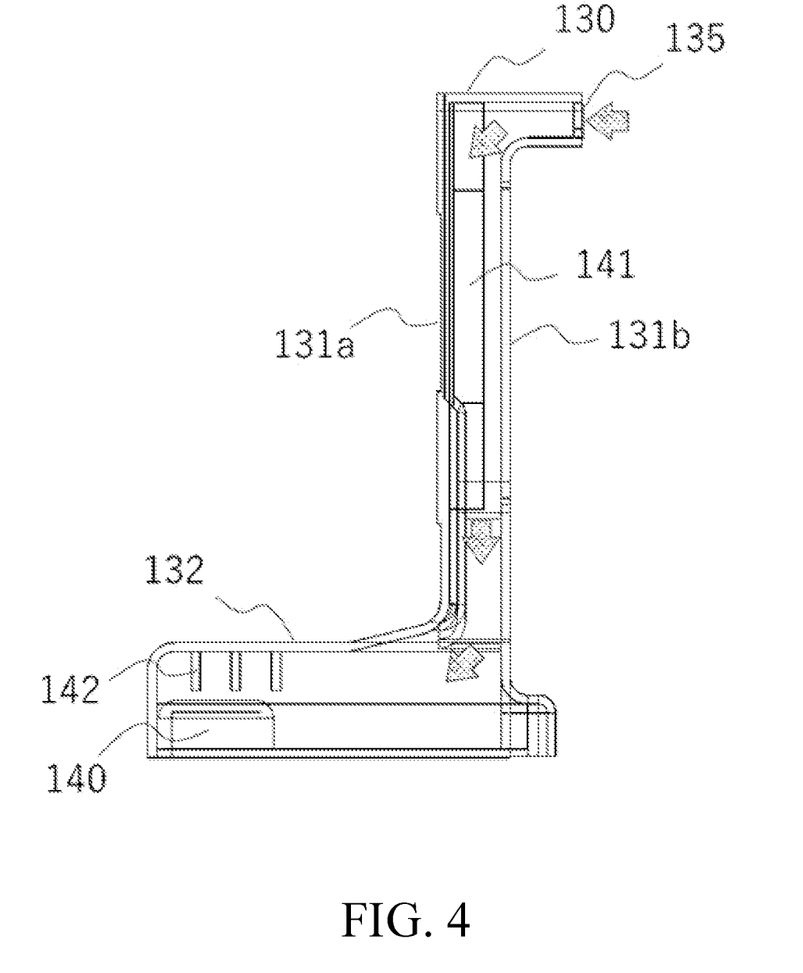
FIG. 4 is a sectional view of the duct according to the first embodiment.

A detailed description will be given of the duct 122. FIG. 3A illustrates the duct 122 viewed obliquely from the front, and FIG. 3B illustrates the duct 122 viewed obliquely from the rear. FIG. 4 illustrates a section of the duct 122 illustrated in FIG. 3B taken along a line A-A.

The duct 122 includes a first duct portion 130, a second duct portion 131, and a third duct portion 132. The first duct portion 130 forms a duct extending in the longitudinal (front to rear) direction parallel to the imaging optical axis O between the display housing unit 102 and the EVF display unit 451. Inlet ports 135 is formed in a rear end surface of the first duct portion 130.

A top portion of the second duct portion 131 is connected to a front portion of the first duct portion 130 to form a duct extending in a vertical direction orthogonal to the imaging optical axis O. Disposing the first duct portion 130 near the EVF display unit 451 and connecting it to the top portion of the second duct portion 131 can secure a wide thermal connection area between the second duct portion 131 and the heat-generating element group 121a. This structure is advantageous in terms of heat radiation from the heat-generating element group 121a.

The second duct portion 131 is made by combining a second front duct portion 131a forming a front surface on the side of the heat-generating element group 121a and a second rear duct portion 131b forming a rear surface on the opposite side of the front surface. A second duct concave portion 131c is formed in an area of the front surface of the second duct portion 131 that does not face the heat-generating element group 121a (that is not thermally connected to the heat-generating element group 121a via a heat transfer member, which will be described below). Forming the second duct concave portion 131c locally reduces the sectional area inside the second duct portion 131. As a result, a large airflow amount inside the area of the second duct portion 131 that is thermally connected to the heat-generating element group 121a through the heat transfer member in the second duct portion 131 can be secured and efficiently radiate heat from the heat-generating element group 121a.

In addition, the heat in the camera 100 can be efficiently diffused in the area of the second duct portion 131 that does not face the heat-generating element group 121a. Therefore, providing the second duct concave portion 131c in the area that does not face the heat-generating element group 121a in the second duct portion 131 can achieve both efficient heat radiation from the heat-generating element group 121a and efficient heat diffusion in the camera 100.

A connector and flexible printed circuits (FPC) for connecting the imaging unit 120 and the main board 121 to each other are disposed in a space on the side of the main board 121 created by the second duct concave portion 131c.

A bottom portion of the second duct portion 131 is connected to a rear portion of the third duct portion 132. The third duct portion 132 is formed so that it extends in the longitudinal direction in parallel with the imaging optical axis O under the imaging unit 120 and the main board 121. An opening is formed in a rear area of the bottom surface of the third duct portion 132, and the duct fan 123 is disposed in the third duct portion 132 through this opening. The opening is closed by fixing a bottom-surface duct cover 133 to the third duct portion 132 with a screw 137 via an unillustrated elastic member. At this time, the duct fan 123 is also fixed to the third duct portion 132 with the screw 137. An exhaust port 136 is formed in the rear end surface of the third duct portion 132.

A tripod seat mount portion 140 having a concave shape is formed in a front area of the bottom surface of the third duct portion 132 where the exhaust port 136 is not formed. Part of the tripod seat 106 fixed to the front base 104 is accommodated in the tripod seat mount portion 140. The front base 104 is made of a magnesium alloy so as to have high rigidity. Thereby, deformation of the camera 100 fixed to a tripod can be suppressed even in a case where the camera 100 receives a strong external force, and as a result, deformation of the duct 122 can be also suppressed.

The inlet ports 135 of the thus-configured duct 122 (the first duct portion 130) are connected to the ventilation ports 110a of the rear cover 101. At this time, an elastic member is interposed between the periphery of the inlet ports 135 in the duct 122 and the periphery of the ventilation ports 110a in the rear cover 101 for sealing, and thereby air is prevented from flowing into the inlet ports 135 from a gap other than the ventilation ports 110a.

The exhaust port 136 of the duct 122 (the third duct portion 132) is connected to the ventilation ports 110b of the side cover 109. At this time, an elastic member is interposed between the periphery of the exhaust port 136 in the duct 122 and the periphery of the ventilation ports 110b in the side cover 109 for sealing, and thereby the air is prevented from flowing out from a gap other than the ventilation ports 110b.

In order to reduce the pressure loss in the duct 122, the flow passages of the first duct portion 130, the second duct portion 131, and the third duct portion 132 may have sectional areas as equal as possible. Even in a case where the flow passages have different sectional areas, each duct portion may be configured so that the difference in sectional area becomes as small as possible.

The first duct portion 130, the second duct portion 131, and the third duct portion 132 may be formed as separate parts and connected to one another by screwing, bonding, crimping, or the like, or integrally formed by a 3D printer or the like. In the case where they are connected to one another, the airtightness of the duct 122 may be secured by inserting the elastic member therebetween.

Each of the first to third duct portions 130 to 132 may be made of a material with high thermal conductivity so that heat from the heat source can be efficiently transferred. Since the contribution of the second rear duct portion 131b to heat diffusion from the heat source is relatively small, it may be made of a material having a lower thermal conductivity than the second front duct portion 131a. From the viewpoint of weight reduction of the camera 100, each of the first to third duct portions 130 to 132 may be made of a material with low specific gravity. If the main material of the duct 122 is metal, it can be used as a ground inside the camera 100, which is advantageous from the standpoint of noise reduction. In this embodiment, the first duct portion 130, the second front duct portion 131a, and the third duct portion 132 is made of aluminum, and the second rear duct portion 131b is made of polycarbonate.

Integrating the second rear duct portion 131b with the rear cover 101 can reduce the thickness of the camera 100 in the longitudinal direction.

In this embodiment, a plurality of first fin portions 141 are formed inside the second front duct portion 131a, and a plurality of second fin portions 142 are formed inside the third duct portion 132. Thereby, the surface area in the second duct portion 131 and the third duct portion 132, that is, the heat exchange area with the air can be increased to enhance the cooling efficiency.

In a case where the duct fan 123 is driven, outside air that has passed through the ventilation ports 110a flows into the duct 122 through the inlet ports 135. The air flowing into the duct 122 flows along the first fin portions 141 in the second duct portion 131 and the second fin portions 142 in the third duct portion 132 to which the heat from the heat-generating element group 121a is transferred, and receives heat from these fin portions 141 and 142. The heated air is sucked from the inlet port of the duct fan 123, is discharged from the discharge port, and is discharged to the outside of the camera 100 through the exhaust port 136 and the ventilation ports 110. In this embodiment, the air is exhausted from the ventilation ports 110b formed in the side cover 109. This is to prevent the exhaust air from directly hitting the face of the user. However, the ventilation port for exhaust may be formed at another location.

Figure 5:
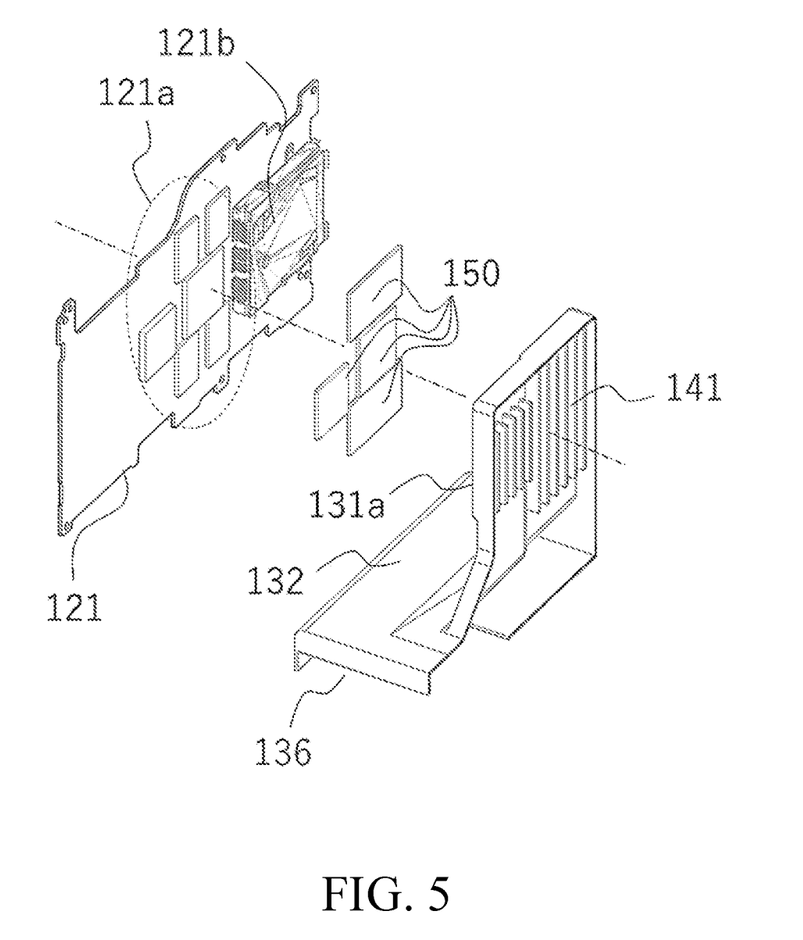
FIG. 5 illustrates the duct and a heat source according to the first embodiment.

FIG. 5 illustrates a thermal connection structure between the duct 122 and the heat source. FIG. 5 illustrates the second front duct portion 131a, the third duct portion 132, the main board 121, and the plurality of heat transfer members 150 in a case where the duct 122 illustrated in FIG. 3B is taken along a line C-C. Each heat transfer member 150 is a heat conductive rubber for thermally connecting the heat-generating element group 121a and the second front duct portion 131a to each other, and contacts the front surfaces of the heat-generating element group 121a and the second front duct portion 131a. The heat generated in the heat-generating element group 121a is transmitted to the second front duct portion 131a (that is, the duct 122) via the heat transfer members 150. The first fin portions 141 are provided in the (rear) area of the second front duct portion 131a which the heat transfer members 150 contact. The heat transmitted from the heat-generating element group 121a to the first fin portions 141 is transmitted to the air flowing along the first fin portions 141 in the second duct portion 131, and the warmed air is exhausted from the exhaust port 136 through the third duct portion 132. Thus, heat exchange is efficiently performed, and the heat-generating element group 121a is sufficiently cooled.

The heat transfer member 150 is not limited to heat conductive rubber, and may be a metal foil, a heat pipe, or the like, as long as it has a higher thermal conductivity than a resin member and satisfies the required mechanical and electrical properties.

Figure 6A:
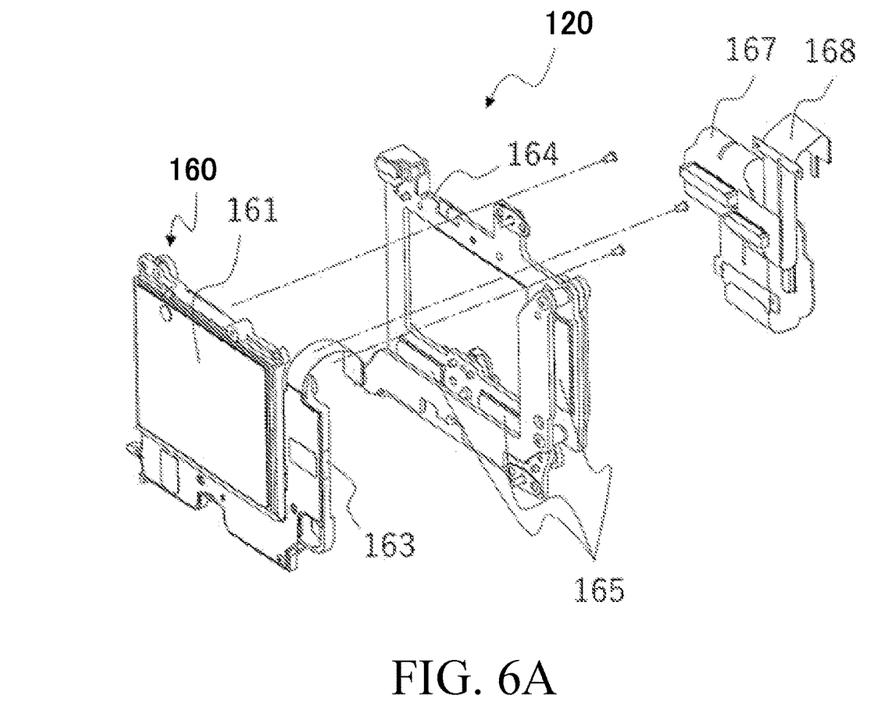
FIGS. 6A and 6B are exploded perspective views of an imaging unit according to the first embodiment.
Figure 6B:
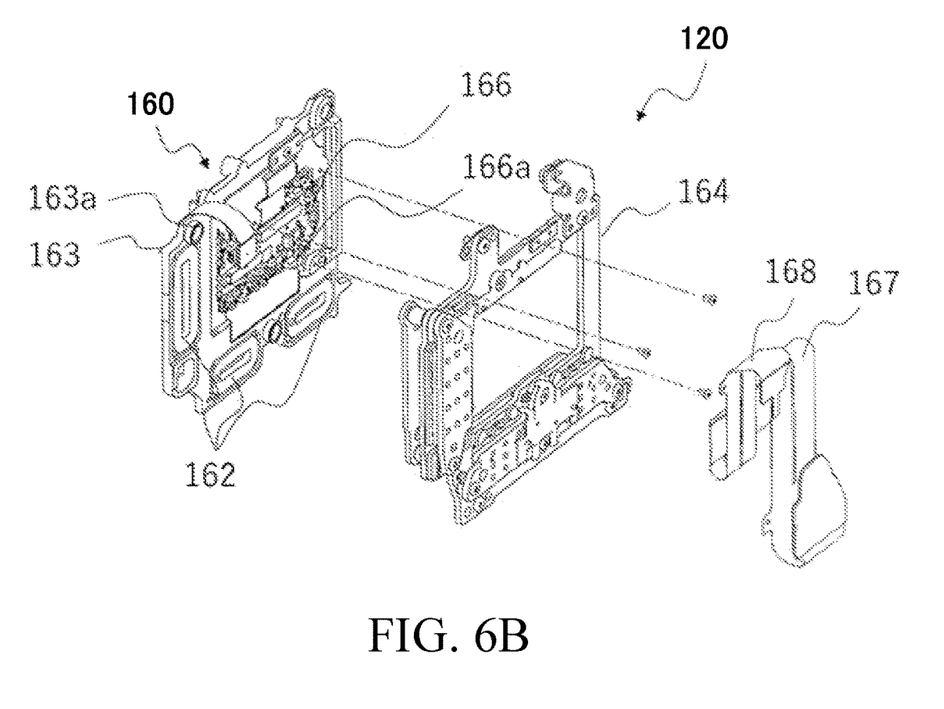

FIGS. 6A and 6B illustrate the imaging unit 120 in an exploded manner from the oblique front side and the oblique rear side, respectively. The imaging unit 120 has the movable portion 160 and a drive base 164. The movable portion 160 includes the image sensor 161 and a sensor holder 163 that holds the image sensor 161. The image sensor 161 is made by bonding a sensor chip having a plurality of pixels to an imaging substrate 166 and electrically connecting electrodes of the sensor chip and an imaging circuit on the imaging substrate 166 by wire bonding. The image sensor 161 is fixed to the sensor holder 163 by adhesion. Electronic devices 166a such as capacitors, resistors, and regulators, that constitute the imaging circuit are mounted on a back surface of a sensor-chip adhesion surface of the imaging substrate 166.

The sensor holder 163 is held by the drive base 164 so as to be movable in two mutually orthogonal directions (horizontal direction and vertical direction) orthogonal to the imaging optical axis O. Three coils 162 are fixed to the sensor holder 163. The drive base 164 holds three magnets 165 so as to face the three coils 162. The movable portion 160 is attracted in the imaging optical axis direction (rear side) by the magnetic force of the magnet 165. Unillustrated balls held by ball holding portions 163a provided at a plurality of locations of the sensor holder 163 are disposed between the movable portion 160 and the drive base 164. Thereby, the movable portion 160 is positioned in the imaging optical axis direction relative to the drive base 164 via the balls.

In the thus-configured imaging unit 120, the image sensor 161 can be moved in the above two directions by controlling the energization of the three coils 162. The camera control unit 420 controls the energization of the coils 162 according to the camera shake detected by the shake detecting unit 442 so as to move the movable portion 160 in a direction to reduce (correct) the image blur caused by the camera shake.

The imaging unit 120 and the main board 121 are electrically connected to each other via an FPC. An imaging signal FPC 167 has wirings for transmitting an imaging signal output from the image sensor 161 and a control signal necessary to drive the image sensor 161, and these signals are sent to the camera control unit 420 on the main board 121. An imaging power supply FPC 168 has wirings for supplying power for driving the image sensor 161 from the power supply control unit 431 to the image sensor 161.

Figure 7A:
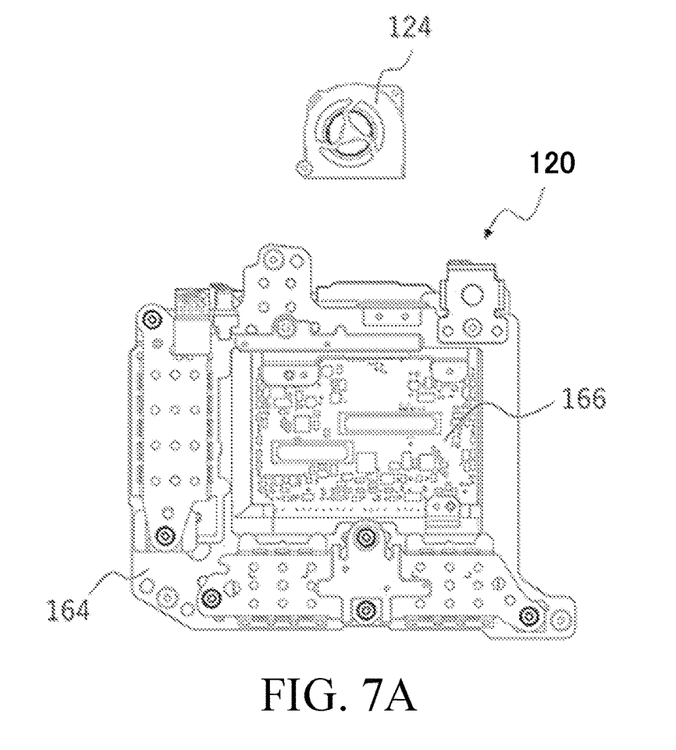
FIGS. 7A to 7C are rear views of the imaging unit and an internal fan according to the first embodiment.
Figure 7B:
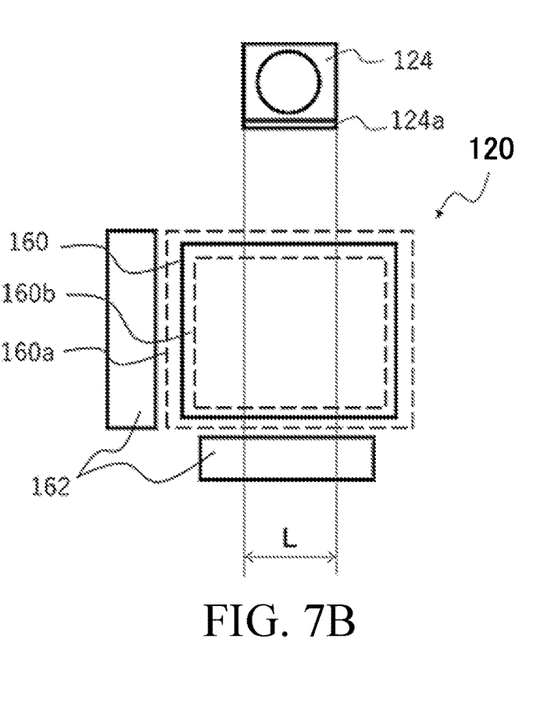
Figure 7C:
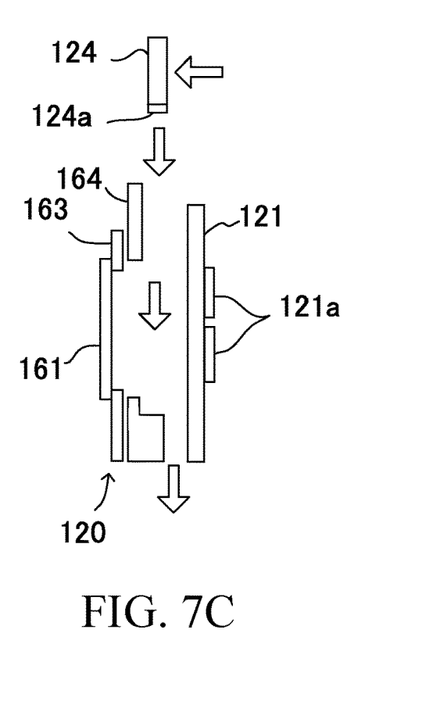

Referring now to FIGS. 7A to 7C, a description will be given of a positional relationship between the movable portion 160 that moves in the imaging unit 120 and the internal fan 124. FIG. 7A illustrates the internal fan 124 and the imaging unit 120 viewed from the rear, and FIG. 7B schematically illustrates them. FIG. 7C schematically illustrates how the air discharged from the internal fan 124 flows between the imaging unit 120 and the main board 121.

As illustrated in FIG. 7C, an orientation of a discharge port 124a of the internal fan 124 is set so that air flows between the imaging unit 120 and the main board 121. Arrows in FIG. 7C indicates a flow of air sucked into the internal fan 124 and air discharged from the internal fan 124.

group 121a and the image sensor 161 by 6° C. or lower in comparison with a case where neither duct fan 123 nor the internal fan 124 is provided.

Referring now to Table 1, a description will be given of control modes of the duct fan 123 and the internal fan 124 in the camera 100. Table 1 illustrates the number of rotations (NoR) of the duct fan 123 and the internal fan 124 in each control (ctrl) mode, and an imaging mode (imaging condition) suitable for each control mode. In each control mode, the rotations of the duct fan 123 and the internal fan 124 are controlled so that the number of rotations of the duct fan 123 and the number of rotations of the internal fan 124 have a predetermined relationship.

TABLE 1

| | NoR | | | | | | IMAGING MODE | |
|---|---|---|---|---|---|---|---|---|
| | DUCT FAN | | | INT FAN | | | | |
| CTRL MODE | NoR (25) | NoR (50) | NoR (100) | NoR (25) | NoR (50) | NoR (100) | IMAGE QUALITY | SP/CP |
| 1ST | | ○ | | ○ | | | FULL HD | C |
| 2ND | | ○ | | | ○ | | 4K | C |
| 3RD | | ○ | | | | ○ | 8K | C |
| 4TH | ○ | | | ○ | | | FULL HD | S |
| 5TH | ○ | | | | ○ | | 4K | S |
| 6TH | ○ | | | | | ○ | 8K | S |
| 7TH | | | ○ | (○) | (○) | (○) | STILL IMAGE/PWR-OFF | C |

In FIG. 7B, reference numeral 160a denotes a moving range of the movable portion 160 in the direction orthogonal to the imaging optical axis, and reference numeral 160b denotes a range in which the image sensor 161 exists (predetermined range: referred to as sensor moving range hereinafter) even if the movable portion 160 moves to a position within the moving range 160a. In a case where a range L in which the air discharged from the discharge port 124a of the internal fan 124 flows when it is viewed from the imaging optical axis direction overlaps the sensor moving range 160b, even if the image sensor 161 moves to any positions within the sensor moving range 160b, the air discharged from the fan 124 flows along the back surface of the image sensor 161 and can cool the image sensor 161. The internal fan 124 that is not physically connected to the movable portion 160 does not hinder the movement of the movable portion 160 (that is, the image stabilizing function).

As described above, in this embodiment, in addition to the duct fan 123 disposed in the duct 122 for cooling the heat-generating element group 121a on the main board 121, the internal fan 124 configured mainly to cool the image sensor 161 is disposed inside the camera 100. Thereby, temperature rises of the heat-generating element group 121a and the image sensor 161 can be suppressed, and malfunction of the camera 100 caused by the excessive temperature rise can be suppressed. In particular, in the case where the image sensor 161 is movable as in this embodiment, the image sensor 161 cannot be thermally connected to the duct 122 using a heat transfer member unlike the heat-generating element group 121a. Therefore, providing the internal fan 124 can suppress the temperature rise of the movable image sensor 161.

A temperature analysis results using a finite element method (FEM) will be illustrated. This embodiment can suppress the temperatures of the heat-generating element Both the duct fan 123 and the internal fan 124 are controlled by the camera control unit 420 so as to rotate at three different numbers of rotations: the number of rotations (25), the number of rotations (50), and the number of rotations (100). The number of rotations becomes higher in the order of the number of rotations (25)<the number of rotations (50)<the number of rotations (100). A parenthesized figure attached to the number of rotations is a merely numerical value for comparing the height of the number of rotations, and does not represent an actual number of rotations or a ratio of the number of rotations.

The camera control unit 420 controls the number of rotations of the duct fan 123 and the number of rotations of the internal fan 124 in first to seventh control modes according to the heat values generated by the image sensor 161 and the main board 121 (heat-generating element group 121a).

A camera including a fan has a risk that the rotation sound of the fan is recorded on a recording medium as noise if it is transmitted to a built-in microphone. Hence, the camera 100 in which the duct fan 123 is disposed in the duct 122 having the inlet ports 135 and the exhaust port 136 as in this embodiment particularly needs to suppress the number of rotations of the duct fan 123 as low as possible to reduce that noise. Of the three numbers of rotations, the number of rotations (25) is the lowest, and noise is less likely to be recorded.

On the other hand, since the internal fan 124 is disposed outside the duct 122 inside the camera 100, its rotation sound is less likely to be transmitted to the microphone than that of the duct fan 123. Therefore, the number of rotations of the internal fan 124 can be set with priority given to cooling (C) the image sensor 161 over noise reduction.

The camera 100 according to this embodiment can record moving images with three types of image quality (number of imaging pixels) of Full HD, 4K, and 8K. The higher the image quality of the moving image is, the higher the power consumption becomes for the calculation processing and recording of the image data. Thus, the heat values of the image sensor 161 and the main board 121 increase. Moreover, in still image capturing, power consumption for the calculation processing and recording of the image data is less than that in moving image capturing and the heat value generated from the combination of the image sensor 161 and the main board 121 becomes lower. Therefore, the heat value generated from the combination of the image sensor 161 and the main board 121 becomes higher in the order of still image capturing<Full HD moving image capturing<4K moving image capturing<8K moving image capturing. Thus, the heat value generated from the combination of the image sensor 161 and the main board 121 is different according to the imaging mode, so the camera control unit 420 controls the number of rotations of each of the duct fan 123 and the internal fan 124 in a control mode that depends on the imaging mode. The camera control unit 420 sets a control mode according to a still or moving image capturing mode selected by the user through the mode switch 461, and a detailed imaging mode such as image quality, cooling priority (CP), and silence priority (SP) selected from the menu screen displayed on the rear display unit 450.

The first to third control modes are control modes that give priority to cooling the image sensor 161. In these first to third control modes, the camera control unit 420 sets the number of rotations of the duct fan 123 to the number of rotations (50) regardless of the control mode, while changing the number of rotations of the internal fan 124 for each control mode. The duct fan 123 has a high cooling effect on the main board 121, but a low cooling effect on the image sensor 161 which is distant from and located on the front side of the main board 121. Therefore, in the first to third control modes, the number of rotations of the duct fan 123 is fixed to the number of rotations (50) at which noise is not significantly influential.

The camera control unit 420 sets the number of rotations of the internal fan 124 to the lowest number of rotations (25) in the first control mode. In this case, the cooling effect of the internal fan 124 on the image sensor 161 becomes low. Thus, the first control mode is a control mode suitable for Full HD moving image capturing, which generates a small heat value.

The camera control unit 420 sets the number of rotations of the internal fan 124 to the number of rotations (50) in the second control mode. The number of rotations (50) is between the number of rotations (25) and the number of rotations (100), and the cooling effect of the internal fan 124 on the image sensor 161 at this time is standard. Thus, the second control mode is a control mode suitable for standard 4K moving image capturing.

The camera control unit 420 sets the number of rotations of the internal fan 124 to the highest number of rotations (100) in the third control mode. At this time, the cooling effect of the internal fan 124 on the image sensor 161 also increases. The third control mode is a control mode suitable for 8K moving image capturing, which generates a large heat value.

The fourth to sixth control modes are control modes that give priority to silence (S). In these fourth to sixth control modes, the camera control unit 420 sets the number of rotations of the duct fan 123 to the number of rotations (25) that generates less noise regardless of the control mode, while changing the number of rotations of the internal fan 124 for each control mode.

The camera control unit 420 sets the number of rotations of the internal fan 124 to the lowest number of rotations (25) in the fourth control mode. In this case, the cooling effect of the internal fan 124 on the image sensor 161 becomes low. Thus, the fourth control mode is a control mode suitable for Full HD moving image capturing, which generates a small heat value.

The camera control unit 420 sets the number of rotations of the internal fan 124 to the number of rotations (50) in the fifth control mode. The cooling effect of the internal fan 124 on the image sensor 161 at this time is standard. Thus, the fifth control mode is a control mode suitable for standard 4K moving image capturing.

The camera control unit 420 sets the number of rotations of the internal fan 124 to the highest number of rotations (100) in the sixth control mode. At this time, the cooling effect of the internal fan 124 on the image sensor 161 also increases. Thus, the sixth control mode is a control mode suitable for 8K moving image capturing, which generates a large heat value.

The seventh control mode is a control mode that prioritizes cooling of the image sensor 161 and the main board 121 over noise reduction over the first to third control modes. The camera control unit 420 sets the number of rotations of the duct fan 123 to the highest number of rotations (100) in the seventh control mode. On the other hand, the number of rotations of the internal fan 124 is set to one of the number of rotations (25), the number of rotations (50), and the number of rotations (100).

In a case where the number of rotations of the duct fan 123 is set to the number of rotations (100), the cooling effect on the main board 121 is high, but the rotation sound is likely to be recorded as noise. Thus, the seventh control mode is not suitable for moving image capturing but is suitable for cooling the main board 121 in still image capturing in which the microphone does not operate or in a power-off state (in a case where capturing is stopped). Sufficiently cooling the main board 121 in still image capturing or in the power-off state can lower the temperatures of the image sensor 161 and the main board 121 in a case where still image capturing is switched to moving image capturing and the influence of the heat of the image sensor 161 on image quality can be suppressed.

Regarding the number of rotations of the internal fan 124, rotating the internal fan 124 at the number of rotations (25) or higher will provide a sufficient cooling effect because the heat value generated by the image sensor 161 is small in still image capturing or in the power-off state.

Thus, controlling the number of rotations of each of the duct fan 123 and the internal fan 124 according to the first to seventh control modes that depend on the imaging mode (still or moving image capturing and image quality) and the power-off state of the camera 100 can satisfactorily cool the main board 121 and the image sensor 161. In addition, imaging is available in the noise suppressed state.

Second Embodiment

Table 2 illustrates the number of rotations of each of the duct fan 123 and the internal fan 124 in eighth and ninth control modes in the camera 100 according to a second embodiment and the imaging mode suitable for each control mode. In each control mode, the rotations of the duct fan 123 and the internal fan 124 are controlled so that the number of rotations of the duct fan 123 and the number of rotations of the internal fan 124 (including 0, which is the number of rotations in the stops state) have a predetermined relationship.

TABLE 2

| | | NoR | | | | | |
|---|---|---|---|---|---|---|---|
| | DUCT FAN | | INT FAN | | | | |
| CTRL | STOP | NoR | NoR | NoR | NoR | IMAGING MODE | |
| MODE | (0) | (25) | (25) | (50) | (100) | IMAGE QUALITY | SP/CP |
| 8TH | ○ | | | | ○ | STILL IMAGE/PWR-OFF | S |
| 9TH | | ○ | (○) | (○) | (○) | FULL HD/4K/8K | S |

The eighth control mode, similar to the seventh control mode described in the first embodiment, is a control mode suitable for still image capturing or the power-off state. In this control mode, the internal fan 124 is stopped in a case where a heat value generated by the image sensor 161 is sufficiently small in still image capturing or in the power-off state. On the other hand, the internal fan 124 is rotated at the number of rotations (100) that provides a high cooling effect.

As described in FIGS. 6A to 7C, the internal fan 124 can have a cooling effect not only on the image sensor 161 but also on the main board 121. In a case where the image sensor 161 generates a small heat value, rotating only the internal fan 124 at the number of rotations (100) can provide a sufficient cooling effect not only for the image sensor 161 but also for the main board 121. Suppressing the power consumption of the camera 100 can be thus expected by stopping the duct fan 123 (by setting the number of rotations to 0) even if only the internal fan 124 is rotated at the number of rotations (100).

The ninth control mode is a control mode that gives priority to silence, similar to the fourth to sixth control modes. In this control mode, the duct fan 123 is rotated at the number of rotations (25) that generates less noise. On the other hand, the internal fan 124 is rotated at any one of the number of rotations (25), the number of rotations (50), and the number of rotations (100) according to the image quality for the moving image. For example, the number of rotations (25) is set to Full HD image quality, the number of rotations (50) is set to 4K image quality, and the number of rotations (100) is set to 8K image quality. This configuration provides a sufficient cooling effect on the image sensor 161.

In this embodiment, the internal fan 124 can cool the image sensor 161 and the main board 121 according to the imaging mode while securing silence by stopping the duct fan 123 or by rotating it at the small number of rotations (25).

Each of the above embodiment can sufficiently cool not only the electronic device but also the image sensor in the image pickup apparatus.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-199528, filed on Dec. 8, 2021, which is hereby incorporated by reference herein in its entirety.

What is claimed is:
1. An image pickup apparatus comprising:
an image sensor configured to capture an object image;
an electronic device configured to perform processing relating to imaging;
a duct thermally connected to the electronic device;
a first airflow generating mechanism configured to generate first airflow for cooling the electronic device in the duct;
a second airflow generating mechanism disposed outside the duct and configured to generate second airflow for cooling the image sensor; and
at least one processor programmed to perform operations to individually control drives of the first and second airflow generating mechanisms,
wherein the at least one processor is programmed to increase a number of rotation of the second airflow generating mechanism as image quality becomes higher, and
the at least one processor programmed to rotate the first airflow generating mechanism at a lower number of rotation in a silence priority mode than the number of rotation of the first airflow generating mechanism in a cooling priority mode.

2. The image pickup apparatus according to claim 1, wherein the second airflow generating mechanism is disposed so that the second airflow flows along a back surface of the image sensor opposite to an imaging plane of the image sensor.

3. The image pickup apparatus according to claim 2, wherein the second airflow generating mechanism is disposed so that the second airflow flows between the back surface of the image sensor and the electronic device to cool the electronic device and the image sensor.

4. The image pickup apparatus according to claim 1, wherein the at least one processor individually controls drives of the first and second airflow generating mechanisms according to an imaging condition of the image pickup apparatus.

5. The image pickup apparatus according to claim 4, wherein the imaging condition determines at least one of still image capturing, moving image capturing, the number of imaging pixels, giving priority to cooling, and giving priority to silence.

6. The image pickup apparatus according to claim 1, wherein the at least one processor controls driving of each of the first and second airflow generating units mechanisms during stopping of imaging.

7. The image pickup apparatus according to claim 1, wherein the at least one processor stops the first airflow generating mechanism at least one of during still image capturing and during stopping of imaging.

8. The image pickup apparatus according to claim 1, wherein the image sensor is movable within a predetermined range relative to an imaging optical axis for image stabilization, and wherein the second airflow generating mechanism is disposed so that the image sensor is cooled by the second airflow regardless of a position of the image sensor within the predetermined range.

* * * * *